R. M. HIGHTOWER.
MUD LUG FOR TRACTION ENGINES.
APPLICATION FILED JAN. 15, 1916.
1,195,815.  Patented Aug. 22, 1916.
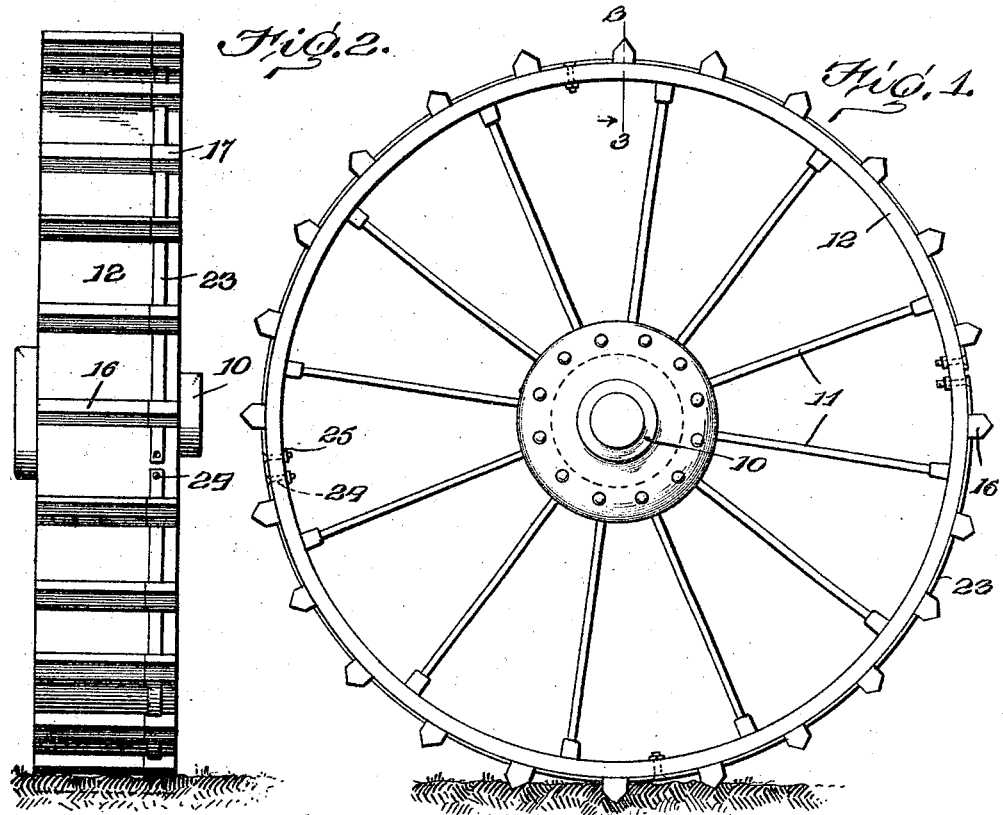
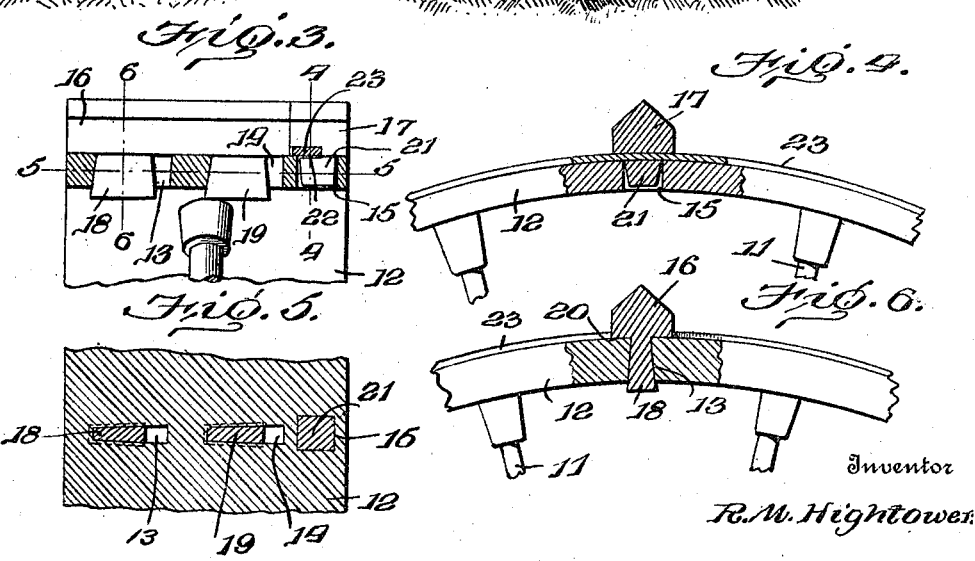
Inventor
R. M. Hightower

UNITED STATES PATENT OFFICE.

ROY M. HIGHTOWER, OF MEADVILLE, MISSOURI.

MUD-LUG FOR TRACTION-ENGINES.

1,195,815.  Specification of Letters Patent.  Patented Aug. 22, 1916.

Application filed January 15, 1916. Serial No. 72,281.

*To all whom it may concern:*

Be it known that I, ROY M. HIGHTOWER, a citizen of the United States, residing at Meadville, in the county of Linn and State of Missouri, have invented certain new and useful Improvements in Mud-Lugs for Traction-Engines, of which the following is a specification.

My invention relates to new and useful improvements in wheels, the primary object of my invention being the provision of a new and improved form of removable mud lug for wheels, and particularly for wheels of the traction type.

A still further object of my invention consists in the provision of detachable lugs each of which is formed in two parts, one part of which, when in place, constitutes a lock for the other.

A further object of my invention consists in so constructing the wheel that those portions of the lugs which serve to lock the remaining portions are, in turn, locked in place, a single locking means being employed for securing a number of the lugs to the rim of the wheel.

In this connection, a still further object of my invention consists in so constructing the lugs and wheel that by the removal of two or three bolts, a series of successive lugs may be freed, whereby any one or more may be readily removed for repair or replaced if injured.

A still further object of my invention consists in constructing a wheel rim having a plurality of tapered slots and lugs having a plurality of locking heads with tapered faces to seat in the slots, whereby when the lugs are secured in place the interengaging tapered faces of the lugs and rim will, to a great extent, hold the lugs against displacement and, therefore, relieve the locking means proper of the majority of the strain which would otherwise have to exist.

With these and other objects in view, my invention will be more fully described, illustrated in the accompanying drawings, and then specifically pointed out in the claims which are attached to and form a part of this application.

In the drawings: Figure 1 is a side elevation of a conventional form of traction wheel, showing my improved traction lugs applied thereto; Fig. 2 is an end elevation of the wheel; Fig. 3 is a fragmentary vertical sectional view taken on the line 3—3 of Fig. 1 looking in the direction of the arrows; Fig. 4 is a section taken on the line 4—4 of Fig. 3; Fig. 5 is a section taken on the line 5—5 of Fig. 3; Fig. 6 is a section taken on the line 6—6 of Fig. 3.

Corresponding and like parts are referred to in the following description and indicated in all the views of the drawings by the same reference characters.

For the sake of clearness, I have illustrated my improved traction lugs as applied to a conventional form of traction wheel including a hub 10, radially extending spokes 11, and a rim 12, the rim being in the form of a relatively thick and wide band of metal, such as iron. This rim is provided at peripherally spaced intervals with a plurality of transversely alined slots 13, 14 and 15, each group of alined slots being adapted to receive the anchoring heads of one of the compound lugs. The slots 13 and 14 have their end walls adjacent the slot 15 formed vertically and their opposite end walls inclined in such a manner that the slots are longer at the inner face of the rim than at the outer face. In like manner, the side walls of the slots 13 and 14 are oppositely inclined in order that the slots may be wider at the inner face of the rim than at the outer face. The slots 13 and 14, as shown in Fig. 5, are considerably longer than they are wide, while, on the other hand, the slot 15 is, as a rule, substantially square with all of its walls at substantially right angles to the faces of the rim.

Each of my improved lugs includes a body portion 16 and locking portion 17. As best shown in Figs. 2 and 3 of the drawings, these lug members, when applied to a wheel rim, extend in alinement with each other and throughout the entire width of the rim, being generally disposed at right angles to the plane of the wheel. The body portion of each lug member is of the same cross sectional shape and size, having parallel side walls beveled at their outer edges to provide a triangular ground engaging shoulder extending throughout the length of the body. Obviously, they may be constructed in any desired cross sectional shape without in any way changing the scope of my invention.

The member 16 of each lug is formed upon that face which engages the outer face of the wheel rim with locking heads 18 and 19 to extend through the slots 13 and 14, respectively, of the rim. As clearly shown in Fig. 6 of the drawings, these locking heads are of less width than the width of the member 16 of the lug in order that the lug may have the rim engaging shoulders 20. The side faces of these locking heads 18 and 19 and one end face of each of the lugs are undercut at the same inclination as the side faces and inclined end face of the slots 13 and 14 and the locking heads are so proportioned with respect to these slots that when they are positioned opposite the wider ends of the slots, they may be passed inwardly until the lug member 16 engages the wheel rim. When so positioned, the member 16 may be moved to bring its outer end flush with the edge of the wheel rim and to bring the narrower ends of the lugs into the narrower ends of the slots, as shown in Fig. 5. Under these conditions, the tapered faces of the locking heads engaging the tapered faces of the slots hold the lug members 16 against all movement other than toward the wider ends of the slots. The locking members 16 of the lugs are employed to prevent this movement and are each provided with a head 21 adapted to seat in one of the slots 15. The inner end face of each of the locking lugs 17 is formed with a transverse slot or recess 22 which, when the locking lug is in place, has its lower face flush with the outer face of the wheel rim. Locking bands 23 extend peripherally of the wheel and seat in the slots or recesses 22, being held against movement toward the adjacent edge of the wheel rim by the neck portions of the locking members 17 connecting the bodies of such members with their heads and against movement toward the center of the rim by abutting against the adjacent ends of the members 16 of the lugs. These locking bands are secured against movement away from the rim by bolts 24 and nuts 25, the bolts being passed through the locking bands at suitable intervals and through the rim. Preferably, the locking bands have their outer faces recessed to seat the heads of the bolts in order to protect them from injury and wear. The locking bands may extend throughout half the circumference of the wheel, two bands to a wheel being employed, or may be of any desired lesser length, those shown in the drawings extending throughout about a quarter of the periphery of the wheel.

In assembling the wheel, the members 16 of the lugs are first applied to the rim in the manner previously described, after which a suitable number of locking members 17 are mounted upon one of the locking bands in proper spaced relation and, together with the locking band, lowered into place to seat their heads in the slots 15 of the rim when the locking band is secured in place by the bolts and nuts. The remaining locking bands, together with the locking portions of the lugs co-acting with them, are then applied in the same manner. Obviously, it is impossible for the locking portions of the lugs to move from the rim in any direction, except radially, because of the engagement of their heads in the slots of the rim and as long as the locking bands remain fastened to the rim this radial movement is prohibited. The engagement between the locking portion of the lugs and the main body portion thereon is, obviously, such as to prevent such sliding movement of the members 16 as would free their heads from the slots 13 and 14 and the entire lugs are, therefore, securely locked in place. As a rule, the locking members of the lugs are separate from the locking bands 23 but if desired they may be connected to them. If this is the case, however, the connection should be such as to permit slight independent movement of the lug members 17 with respect to the band section to which they are connected in order to facilitate their application to the wheel rim.

Although I have illustrated and described my invention in all its details of construction, it will of course be understood that I do not wish to limit myself to such details, as various minor changes, within the scope of the appended claims, may be made at any time, without in the slightest degree departing from the spirit of my invention.

Having thus described the invention, what is claimed as new is:

1. In wheel construction, the combination with a wheel rim having transversely alined slots, of a two-part traction lug having heads adapted to project into the slots, certain heads of one of the lug members being capable of wedging engagement in the slots when such member is moved to a predetermined position and the other lug member when in place being capable of holding the first member against movement from such position, and means for securing said latter lug member in place.

2. In wheel construction, the combination with a wheel rim having a series of transversely disposed slots, of a two-part traction lug having heads adapted to project into the slots, certain heads of one of the lug members being capable of wedging engagement in the slots when such member is moved to a predetermined position and the other lug member when in place being capable of holding the first member against movement from such position, and means for securing said latter lug member in place, said means including a band secured to the outer face of the rim and seating in a notch formed in the latter lug member.

3. In wheel construction, the combination with a rim having a transverse series of slots, certain of which have their walls at one end correspondingly inclined and their corresponding side walls similarly inclined, of a traction lug member including a body adapted to rest against the rim, heads formed upon the body to seat in the slots and each having one end wall and its side walls inclined, the heads being of less length than the length of the slots, whereby they may be inserted through the wider sides of the slots and forced into the opposite ends to wedge therein, a second traction lug member having a body portion forming a continuation of the first and a head for seating in one of the slots to hold its body member in engagement with the body member of the first lug member and prevent movement of the first lug member in a direction to free its heads from wedging engagement in the slots they engage in, and means for securing the second lug member against disengagement from its slot.

4. In wheel construction, the combination with a wheel rim having a plurality of peripherally spaced series of slots, each series of slots including a plurality of transversely spaced alined slots, of a plurality of mud lug members having heads wedging in certain of the slots of each of the series to hold their members against movement save in one direction, a plurality of locking lug members having heads seating in the other slots of each series and engaging the first lug members to hold them against movement, and means for securing the locking lug members against displacement.

5. In wheel construction, the combination with a wheel rim having a plurality of peripherally spaced series of slots, each series of slots including a plurality of transversely spaced alined slots, of a plurality of mud lug members having heads wedging in certain of the slots of each of the series to hold their members against movement save in one direction, a plurality of locking lug members having heads seating in the other slots of each series and engaging the first lug members to hold them against movement, and means for securing the locking lug members against displacement, said means securing a plurality of successively spaced locking lug members.

6. In wheel construction, the combination with a wheel rim having a plurality of peripherally spaced series of slots, each series of slots including a plurality of transversely spaced alined slots, of a plurality of mud lug members having heads wedging in certain of the slots of each of the series to hold their members against movement save in one direction, a plurality of locking lug members having heads seating in the other slots of each series and engaging the first lug members to hold them against movement, and means securing the locking lug members against displacement, said means including bands extending peripherally about the rim and engaging in slots formed in the sides of the locking lug members, and fastening means securing the bands to the rim.

7. In wheel construction, the combination with a wheel rim having alined slots, of a mud lug member having a head wedging in one of the slots to hold such member against movement except in one direction, a locking lug member having a head seating in the other slot and engaging the first lug member to hold it against movement, and means for securing the locking lug member against displacement.

8. In wheel construction, the combination with a wheel rim having a plurality of peripherally spaced series of slots, the slots of each series being transversely alined, of a plurality of mud lug members wedging in one slot of each series, a plurality of locking lug members engaging in another slot of each series and holding the first in place, and means engaging a plurality of successively spaced locking lug members to hold them against displacement.

In testimony whereof I affix my signature.

ROY M. HIGHTOWER. [L. S.]

Copies of this patent may be obtained for five cents each, by addressing the "Commissioner of Patents, Washington, D. C."